Figure 1:
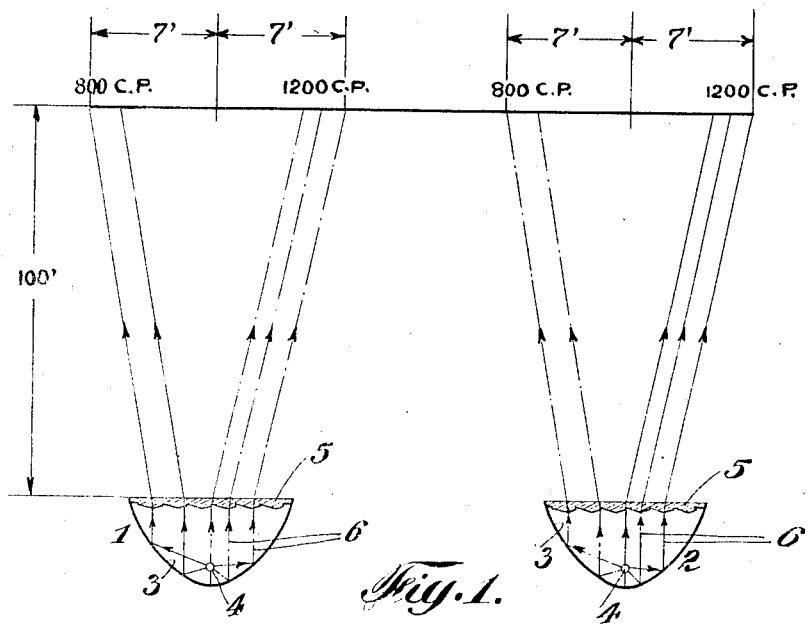

Oct. 23, 1923.

E. LYNDON 1,471,668

HEADLIGHT LENS

Filed Sept. 16, 1921   3 Sheets-Sheet 1

Inventor
Edward Lyndon

By Morris Hirsch
His Attorney

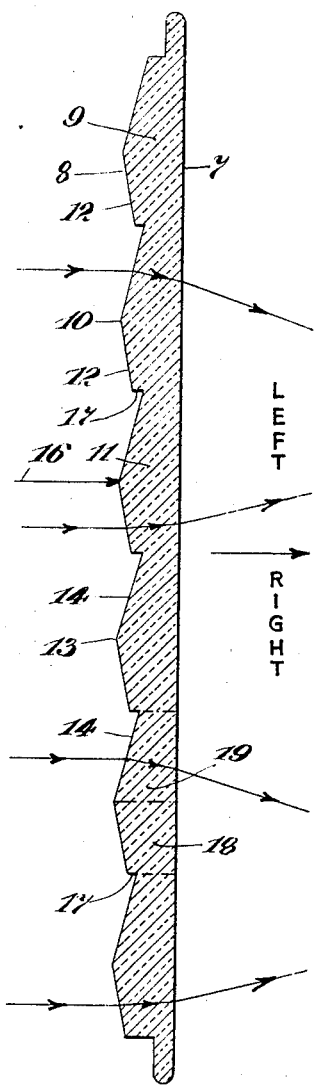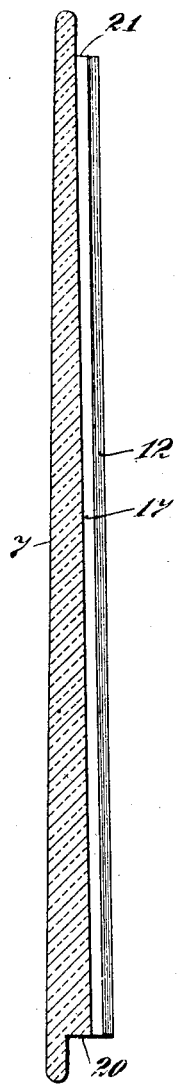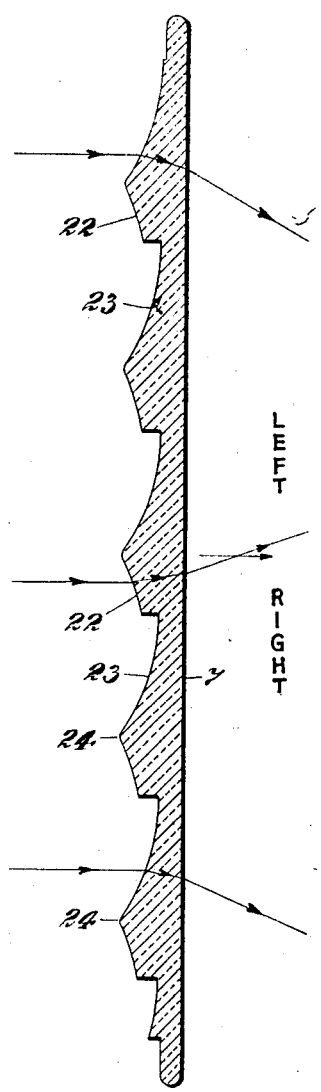

Oct. 23, 1923.
E. LYNDON
1,471,668
HEADLIGHT LENS
Filed Sept. 16, 1921
3 Sheets—Sheet 3
Fig. 6.
Fig. 7.
Fig. 8.
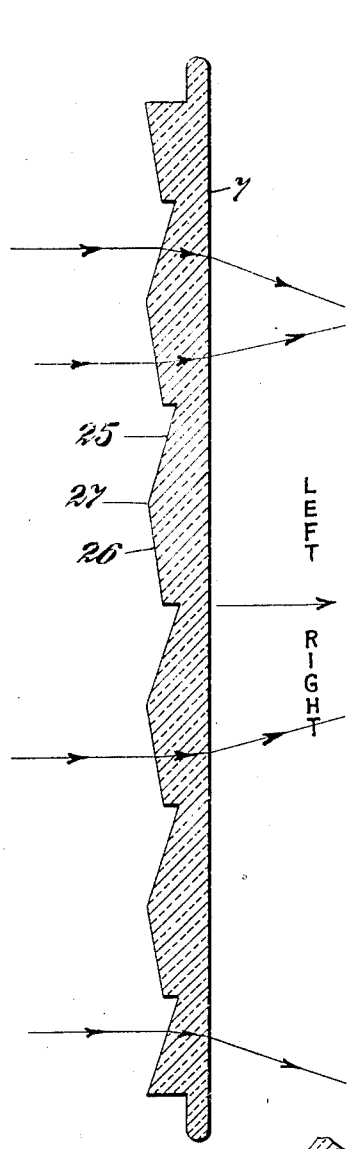
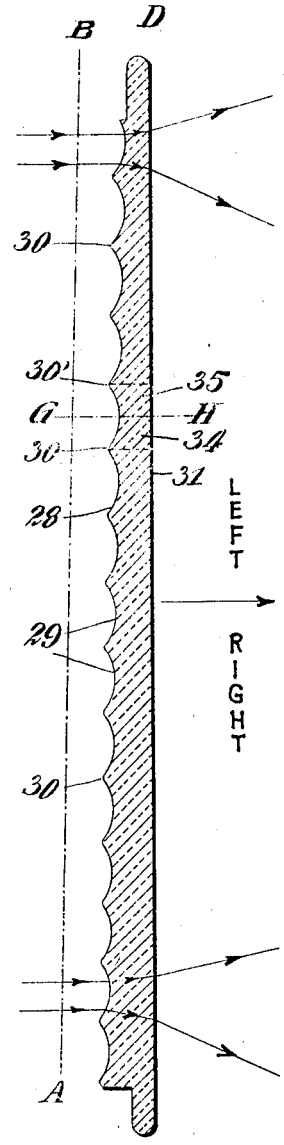
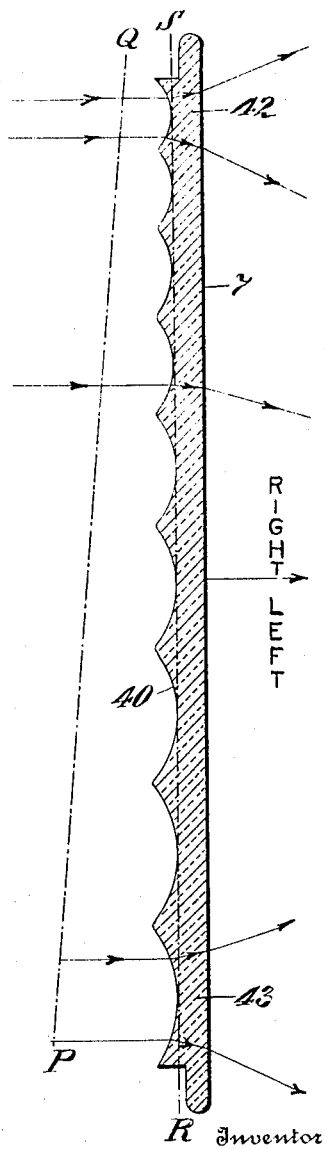
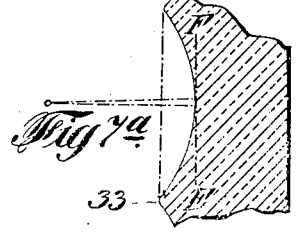
Inventor
Edward Lyndon
By Morris Hirsch.
his attorney Patented Oct. 23, 1923.

1,471,668

UNITED STATES PATENT OFFICE.

EDWARD LYNDON, OF NEW YORK, N. Y.

HEADLIGHT LENS.

Application filed September 16, 1921. Serial No. 501,020.

*To all whom it may concern:*

Be it known that I, EDWARD LYNDON, a citizen of the United States, and resident of New York city, in the county of New York and State of New York, have invented certain new and useful Improvements in Headlight Lens, of which the following is a specification.

My present invention relates primarily to light distribution, and with regard to its preferred application, to headlights for automobiles and other vehicles.

An object of the invention is to provide a single headlight construction by the use of which the light will be efficiently distributed in accordance with requirements.

The laws of various States specify that automobile headlights must provide an intensity of illumination of at least a stated minimum. The regulations of many of the more important States, however, are satisfied by the provision of an intensity of illumination toward the left of the car less than the minimum required toward the right. While the latter requirement could be partially met by properly differentiating the structures of the two headlights, this introduces among others, the difficulty of requiring the manufacture and keeping in stock of left and right headlights or elements thereof of different construction. On the other hand the provision of identical headlights to produce at the left, the same higher intensity that is required at the right results in needless waste of current, while the provision of adjustments for turning a pair of identical headlights toward the right to the proper degree to effect the asymmetrical light distribution desired, introduces mechanical complications, and detracts from the appearance of the car.

It is an object of the present invention to effect distribution of light, to meet the above or any other requirements, without differentiating the construction of the right-hand headlight from the left, without turning the headlights or either of them from central or neutral position, and without the waste of power incident to providing at any point an excess illumination beyond the minimum specified.

According to a preferred feature of the invention, I provide a headlight unit, the light-deflecting structure of which is asymmetrical with respect to a vertical axial plane, the asymmetry being such as to distribute the light in accordance with requirements.

In the preferred embodiment, the headlight structure includes the ordinary paraboloid mirror with the source of light at its focus, and the headlight lens being provided with a series of integral vertical prismatic conformations asymmetrically formed or disposed in any of a wide variety of ways, some of which are specified below, to effect the asymmetric light distribution desired.

According to another feature of the invention, means is provided for projecting substantially all of the light below a definite level in order to prevent glare, such means while in itself old and well known, being embodied in a unitary construction with the foregoing means, that is, with the means for projecting the light asymmetrically. Broadly, the desired distribution in a horizontal and in a vertical plane can be achieved by the use either of reflecting or refracting elements or by a combination of both.

Figure 2:
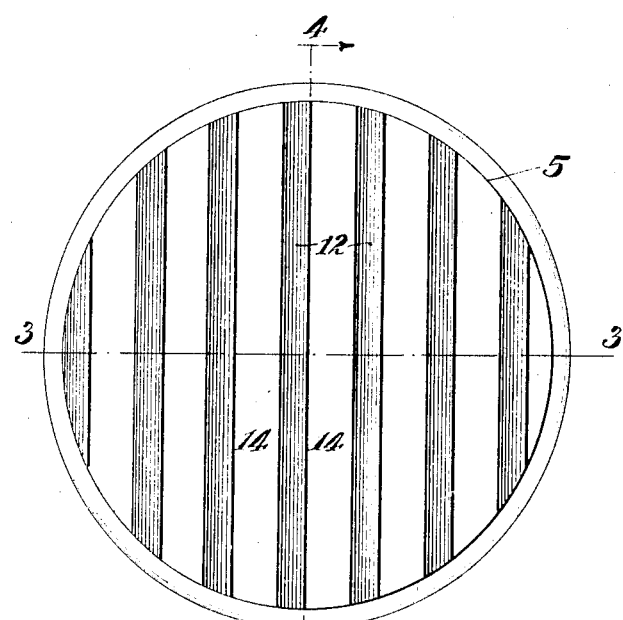

In the accompanying drawings in which is shown one or more of various possible embodiments of the several features of the invention, Fig. 1 is a diagrammatic view illustrating the minimum requirements of certain State laws, Fig. 2 is an elevation of a preferred form of lens, Fig. 3 is a sectional view thereof taken along line 3—3, Fig. 4 is a sectional view taken along line 4—4 of Fig. 1, and Figs. 5, 6, 7, 7ª and 8 are views similar to Fig. 3 of modifications.

Referring now to Fig. 1 of the drawings, I have indicated diagrammatically and not to scale the distribution of headlight illumination required in a number of the States. As shown, the requirements are that there be a minimum illumination of 1200 c. p. at a point which is seven feet to the right of the vehicle, and at a distance of 100 feet in advance thereof, while at the corresponding point to the left of the vehicle, the minimum illumination need be but 800 c. p.

In the preferred embodiment, I employ a pair of identical headlights 1 and 2, each including the usual paraboloid mirror 3, having its source of light at its focus 4. The glass or lens 5 is of special asymmetric construction to be set forth below, so designed as to refract the parallel rays 6 to produce the distribution required, that is, to effect an intensity of 800 c. p. to the left of the light and 1200 c. p. to the right, or broadly stated, an intensity 50% greater toward the right than toward the left.

In Figs. 2, 3 and 4 I have shown a preferred lens for accomplishing the distribution. One face 7 of the lens is preferably flat or of uniform curvature and the other face 8 is irregular. The lens, in effect, comprises a succession of prismatic conformations 9, 10, 11, etc. identical in cross section as shown, each having a shorter slope 12 extending toward the right from its vertex 13 and a longer slope 14 toward the left. The short slopes and the long slopes form equal angles with the normal indicated by arrow 16, the longer slopes being, however, 50% greater in width than the shorter slopes. A shoulder 17 connects the extreme end of each longer slope to the adjoining end of the shorter slope of the succeeding prismatic conformation. Each prismatic conformation is thus composed of a narrow prism 18 and a wider prism 19, the two prisms having equal refractive angles and deflecting the light toward opposite sides. In view of the fact that the wider prisms intercept a greater amount of light than the narrower, it follows that a correspondingly greater amount of light will be deflected toward the right. The parallel beam from the parabolic mirror reaching the prismatic lens is refracted thereby in the manner indicated in dot and dash lines, half again as much light being refracted toward the right as toward the left. It will thus follow that if a source of light of sufficient candle power is used, the requirements above stated and indicated in Fig. 1 would be met. It will be noted that the minimum requirements are met but not exceeded, so that there is no waste of current. It is further seen that this desirable distribution is effected without turning the headlights from central or neutral position. It is further seen that this result is achieved by the use of the special lens described in a headlight otherwise of ordinary construction.

Any desired means may be employed for preventing glare. This means, is, however, preferably embodied in the same integral construction with the headlight lens described. Preferably as shown in Fig. 4, the lens is thicker at the bottom 20 than at the top 21 and has a continuous taper resulting in a prismatic conformation that will deflect the light downwardly as required. Other equivalent means may be employed, if desired, for the purpose of avoiding glare.

In Fig. 5 is shown a modified form of lens, generally along the lines of that shown in Figs. 2, 3, and 4. In this embodiment, however, the slopes 22 and 23 corresponding to slopes 12 and 14 respectively in Fig. 2 have each a predetermined curvature instead of being straight, the curvature of the longer slope 23 being greater than that of the shorter slope 22. By this means not only will a greater amount of light be intercepted by the elements to the right of each vertex 24 but such greater amount will be refracted through a greater angle than that intercepted by the left-hand slopes. It will be apparent that by varying the curvatures, any desired angles of refraction and any desired asymmetric distribution can be effected.

In Fig. 6 I have shown a further modified form of the invention, generally similar to Fig. 2 except that the widths of the two prism elements at opposite sides of each vertex 27 are equal, so that equal amounts of light are intercepted by the right and left-hand slopes 25 and 26 of each of the prismatic conformations. The right-hand slopes 26, however, form a greater angle with the normal than the left-hand ones. It follows that equal amounts of light are refracted to the two sides, but the light projected toward the right is refracted through a greater angle than that toward the left. By proper choice of the relative refractive angles, the desired asymmetric distribution results.

In Fig. 7 is shown another modified form of the invention. The irregular surface 28 in this embodiment consists of a series of identical concave cylindrical elements or grooves 29 each extending in a vertical plane, the successive cylindrical arcs intersecting at vertices 30, the axes of the successive cylinders being, as shown, upon a plane A—B forming an angle with the bounding plane C—D of the continuous or regular surface 31 of the lens as shown in the drawings. To analyze the action of this lens upon the light, reference is had to the auxiliary Figure 7ᵃ. This figure shows a fragment of the lens upon an enlarged scale. A plane E—F being described, tangent to the groove and parallel to the plane C—D of the lens, it will be apparent that by reason of the peculiar arrangement of cylinders, this tangent plane will contact the cylindrical arc toward the left of its center. The excess length 33 of the segment of the cylindrical arc to the right of the point of tangency over that to the left, will, as indicated, project the light intercepted thereby toward the right. The remaining symmetrical portion of the lens acts to diffuse the light symmetrically in the well-understood manner. Thus, this particular lens is made up of a succession of elements for causing a uniform dispersion combined with a succession of further elements 33 that act to refract a portion of the light toward the right. The light will, therefore, be well diffused and a sufficient excess will be thrown toward the right to meet requirements. Obviously, different requirements can be met by providing lenses of this type with different angles between the locus of centers and the plane of the lens.

From another point of view, the segment of the lens between successive vertices as between vertices 30 and 30' comprises two prisms 34 and 35 at opposite sides of the normal plane G—H prism 34 intercepting a greater amount of light than prism 35. It is thus seen that the lens is in effect made up of a succession of prisms, arranged in two series, alternately of lesser and greater width, those of greater width refracting an excess of light toward the right, thereby achieving the asymmetric distribution desired.

From still another point of view, the lens as a whole has a prismatic structure, the thickness increasing gradually from the left toward the right eye. This results in deflecting the light as a whole toward the right. The cylindrical grooves act to disperse the light thus thrown as a whole toward the right, the result of this dispersion being to distribute the light in accordance with requirements, part toward the left of the lens and a greater amount toward the right. It will be apparent that in the case of each of the other forms of the invention, the lens may taper from left to right in the same manner.

In Fig. 8 is shown a still further modification generally similar to that of Fig. 7, the radii of the cylindrical surfaces 40 being, however, of graduated lengths increasing in progression from the left-hand to the right-hand edge of the lens, the locus plane P—Q of the cylinder axes being at an angle to the plane of the lens. The slope of the locus plane is equal to the rate of increase in the cylinder radii, so that a common tangent plane R—S for all of the cylinders will be parallel to the face of the lens. It will be seen that the refractive angle of the prism element 42 at the right edge which has the smallest radius is greater than that of the prism element 43 toward the left which has the largest radius, and that the refractive angles of the intermediate prisms decrease progressively from prism 42 to prism 43. Thus, each prism element between successive vertices will uniformly diffuse the light intercepted thereby, but the element of greater diffusive power being toward the left of the lens, the amount of light refracted toward the right exceeds that toward the left, as required.

In each of the forms of the invention it will be understood that the lens will preferably be formed of tapering thickness greater at the lower than at the upper edge substantially as indicated in Fig. 4 although other means may be employed to eliminate glare. In the specific embodiment of Fig. 7, the lens would thus be generally thicker at the right than at the left and thicker at the bottom than at the top.

It will be seen that in the preferred embodiments, a greater amount of light is refracted toward the right than toward the left, while in certain of the other embodiments, notably in that shown in Fig. 6, equal amounts of light are deflected toward the two sides, but that toward the right is shifted through a greater angle. In both forms the "refractive power" of the parts or elements that deflect light toward the right is superior to that which operates toward the left, the term "refractive power" designating the product of amount of light deflected by angle of deflection.

It will be understood that in the use of any of the forms of lens shown, no occasion will arise for differentiating in any respect between the right-hand and the left-hand lens, identical structures being used for both. The lens, in each case, is simply applied to the ordinary headlight frame in the manner of an ordinary lens. The parallel beam will be refracted by the lens in each case to meet the requirements heretofore noted, an intensity of illumination being provided at a predetermined distance forwardly and toward the right in each case, greater than that toward the left. Obviously by designing the lens in accordance with the foregoing disclosures and by providing a headlight lamp of appropriate candlepower, the light will be projected to produce the intensities required by the laws of certain States, as diagrammatically indicated in Fig. 1.

It will further be seen that though the lens is formed of a single integral piece of glass, the same may be made of composite construction embodying glasses of different refractive indices to produce the asymmetric distribution desired. Obviously, the lens may be modified to produce any desired asymmetric distribution other than that indicated in Fig. 1.

It will be apparent that the paraboloidal mirror may be modified in form asymmetrically at its sides, to thereby project more light toward one side than toward the other, but I prefer to effect the desired distribution by refraction as set forth.

It will be apparent that the invention is not confined in its application to headlights, but may be applied broadly for effecting any desired asymmetric distribution of light in any relation.

It will thus be seen that there is herein described apparatus in which the several features of this invention are embodied, and which apparatus in its action, attains the various objects of the invention and is well suited to meet the requirements of practical use.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

I claim:—

1. A headlight lens including one substantially vertical continuous face and the other face composed of a succession of substantially vertical similar configurations inclined downward with respect to said face, each said configuration having portions sloping laterally and asymmetrically toward said vertical face in opposite directions.

2. A headlight lens having a succession of substantially identical prismatic conformations on one face thereof, said conformations substantially vertical for lateral spread of the light, each said conformation being asymmetrical and having two surfaces extending in opposite directions from the vertex and forming substantially equal angles with the plane of the lens, the surface to one side of each vertex being longer than the surface to the other side thereof, the longer surface of each of said conformations lying to the same side of the vertex thereof.

3. A headlight lens having a succession of prismatic conformations, the vertices of the successive conformations being substantially equidistant, said conformations substantially vertical for lateral spread of the light, the prism surfaces extending at equal angles from opposite sides of a normal plane, the refracting plane toward one side being greater in length than that toward the other, the longer surface of each of said conformations lying to the same side of the vertex thereof and a substantially normal shoulder connecting the end of a longer refracting surface with an end of the shorter refracting surface of the adjacent element.

4. A headlight lens including an integral refracting structure comprising two sets of prismatic elements, one set arranged to deflect the light away from normal to the glass and toward one side, the other set arranged to refract the light away from normal toward the opposite side, said prismatic elements having the same angle of refraction, those of one set being wider and intercepting a greater quantity of light than those of the other set, whereby a greater total quantity will be projected toward one side than toward the other.

Signed at New York, in the county of New York and State of New York, this 14th day of Sept., A. D. 1921.

EDWARD LYNDON.